June 9, 1936.  J. L. DEMENT  2,043,887

FURNITURE TRUCK

Filed May 16, 1935  2 Sheets-Sheet 1

Inventor
J. L. Dement.

By Lacey & Lacey, Attorneys

June 9, 1936.  J. L. DEMENT  2,043,887
FURNITURE TRUCK
Filed May 16, 1935  2 Sheets-Sheet 2
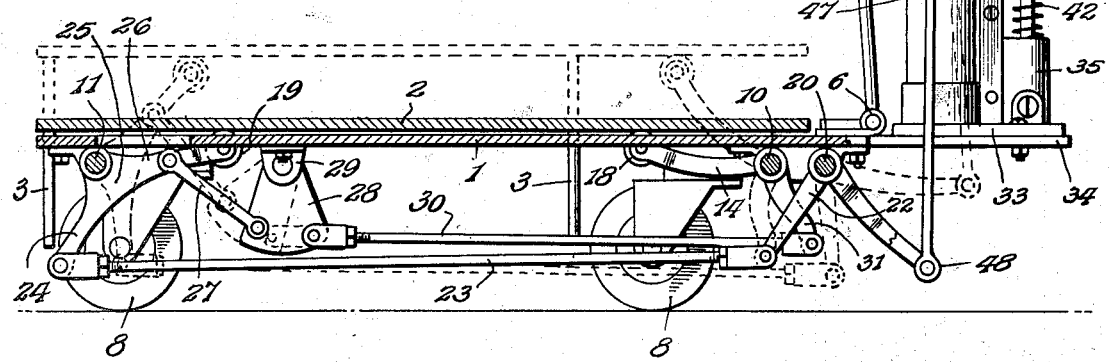
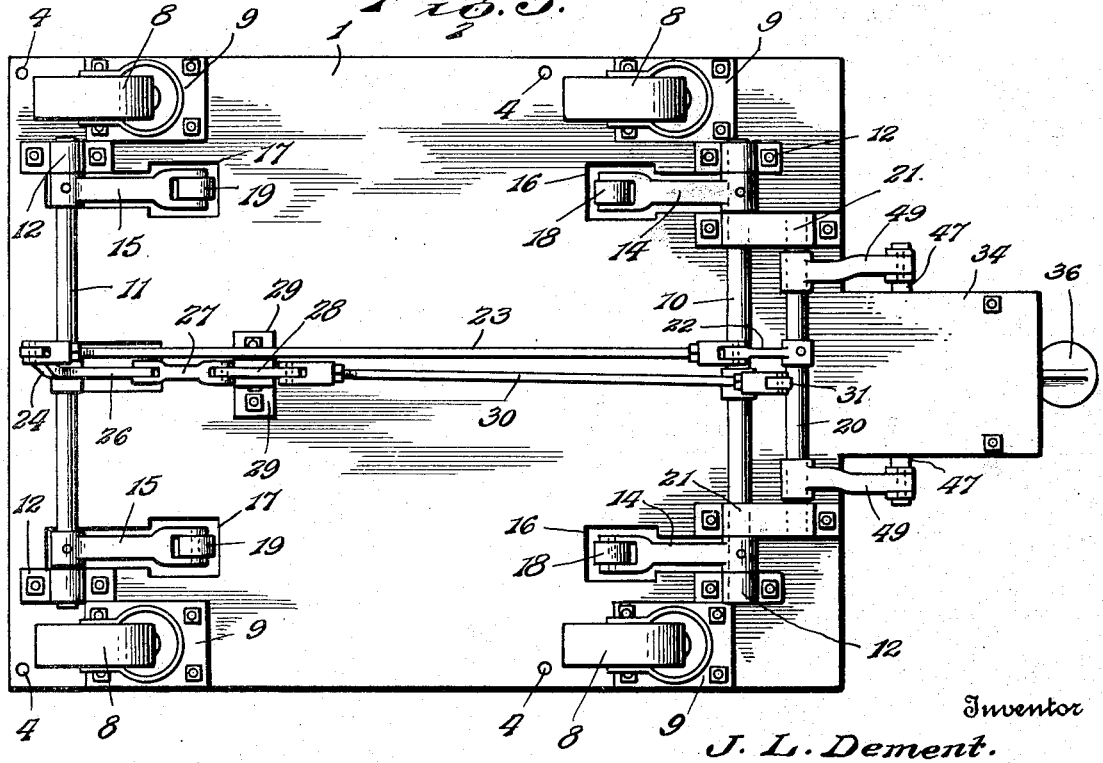
Inventor
J. L. Dement.
By Lacey & Lacey, Attorneys Patented June 9, 1936

2,043,887

UNITED STATES PATENT OFFICE 2,043,887

FURNITURE TRUCK

John L. Dement, San Antonio, Tex.

Application May 16, 1935, Serial No. 21,865

7 Claims. (Cl. 254—9)

This invention relates to an improved furniture truck which is particularly adapted for use when moving heavy and bulky furniture from one place to another in a factory or store.

At the present time trucks are used when moving large and heavy articles of furniture from one location to another but they have been found unsatisfactory as it is difficult to place a truck under the article of furniture which is to be moved due to the fact that the heavy piece of furniture must be lifted to a sufficient height to permit the truck to be slid into place and if the truck may be freely moved into place under the article, it is still necessary to provide means upon the truck to elevate the article a sufficient distance to move it out of engagement with the floor so that it may be transported from the truck.

Therefore, one object of the invention is to provide a truck which is of such height that it may be easily moved under an article of furniture, the body of which is either quite close to the floor or at some distance above it, and an adjustable platform constituting part of the truck then shifted upwardly to a position in which it will engage the article of furniture and support it in a raised position out of contact with the floor. It will thus be seen that the heavy article of furniture may be very easily moved upwardly out of contact with the floor when the truck is beneath it, then transported to a desired location, and lowered into position to rest upon the floor.

Another object of the invention is to so mount the furniture engaging platform of the truck that it may be shifted vertically very easily but prevented from having movement longitudinally or transversely of the body of the truck and thus eliminate any danger of the furniture not being firmly supported while being transported.

Another object of the invention is to provide improved means for vertically adjusting the auxiliary furniture engaging platform and supporting it in an elevated position, this means being of such construction that when the auxiliary platform is moved vertically, its front and rear end portions will be shifted vertically simultaneously and at the same rate of speed, thereby retaining this auxiliary platform level and eliminating any danger of the article of furniture sliding off of the truck due to improper balance.

Another object of the invention is the provision of hydraulic means for actuating the elevating means and thereby allow the auxiliary platform to be easily moved upwardly even when a very heavy article is to be transported.

Another object of the invention is to provide a truck of such construction that the hydraulic means will be so located that it may be very easily actuated without interference by the article to be lifted and transported.

Another object of the invention is to provide the truck with a handle of such construction that the truck may be easily moved by either pulling or pushing upon the handle and also very easily guided by a person holding the handle, and to further so mount the handle that when the truck is not in use the handle may be disposed in an upright position where it will be out of the way.

The invention is illustrated in the accompanying drawings, wherein

Figure 2 is a sectional view taken longitudinally through the truck with the auxiliary platform shown in its lowered position in full lines and its raised position being indicated by dotted lines.

Figure 3 is a bottom plan view of the truck.

Figure 1:
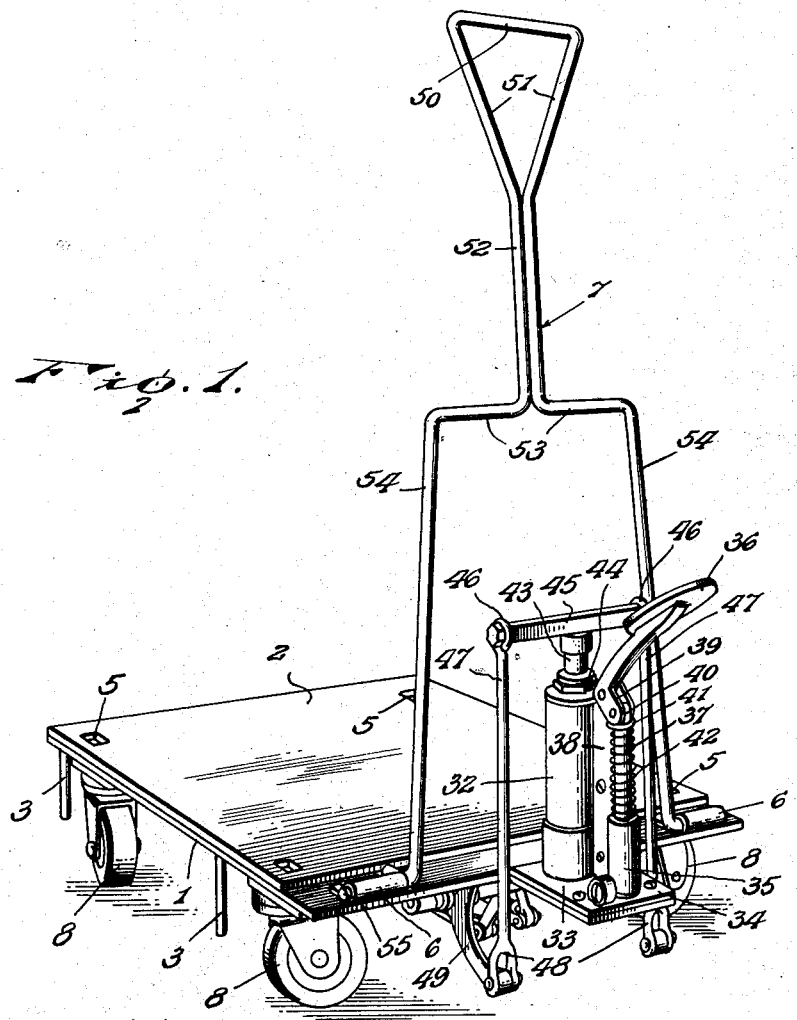
Figure 1 is a perspective view of the improved truck.

This improved truck has a main platform 1 which may be formed from a single sheet of strong metal such as steel of sufficient thickness and toughness to prevent danger of its bending or may be formed in sections suitably secured together if so desired. A supplemental platform 2 which is also formed from sheet steel of sufficient thickness and toughness to support the weight of a heavy article of furniture without bending is disposed over the main platform and is provided with depending rods 3 which are slidably engaged through openings 4 formed in the main platform and allow the auxiliary platform to be shifted vertically but prevent it from moving longitudinally or transversely of the main platform. Therefore, the auxiliary platform may not move out of its proper position relative to the main platform. There have also been provided openings 5 which are formed in corner portions of the auxiliary platform, the purpose of which will be hereinafter set forth. Referring to Figures 1 and 2 it will be seen that the forward edge of the auxiliary platform terminates in spaced relation to the forward edge of the main platform, thereby permitting hinged members or socket bearings 6 for carrying the handle 7 to be mounted at the front of the main platform without interfering with the auxiliary platform. It will thus be seen that the auxiliary platform when lowered may, for its entire area, have flat contacting engagement with the upper face of the main platform. Casters 8, which are swiveled to mounting plates 9, are provided for front and rear portions of the main platform and are bolted or otherwise firmly secured against the under face of the main platform adjacent side edges thereof. These casters are of a conventional construction which permit the truck to be easily moved forwardly, rearwardly, or transversely and, therefore, the truck may be very easily pulled or pushed and also may be easily guided when in motion. The casters are preferably formed with thick rubber treads so that the truck when loaded may be moved across a floor without marring the floor.

Shafts 10 and 11 extend transversely of the truck adjacent front and rear ends thereof where they are rotatably mounted in bearings 12 bolted to the main platform and these shafts carry rocker arms or levers 14 and 15 which extend longitudinally of the truck and are adapted to move upwardly through openings 16 and 17 when the shafts are rotated in a raising direction so that the rollers 18 and 19 at free ends of the arms will make contact with the under face of the auxiliary platform and shift the platform vertically, as indicated by dotted lines in Figure 2. An operating shaft 20, which extends transversely of the truck between the shaft 10 and the forward end of the main platform, is rotatably mounted in bearings 21 bolted to the under face of the main platform and this operating shaft carries a crank arm 22 which is pivoted to one end of a link or reach bar 23 extending longitudinally of the truck and having its rear end pivoted to the arm 24 of a bell crank lever 25 fixed to the rear shaft 11. The upper arm 26 of the bell crank lever has pivoted thereto a link 27 which has its other end pivoted to a rocker plate or block 28 and upon referring to Figures 2 and 3 it will be seen that this rocker plate has its upper end pivotally mounted between bearing brackets 29 bolted to the under face of the main platform. A reach bar or link 30 which has its rear end pivoted to the forward portion of the block 28 extends forwardly therefrom longitudinally of the truck and at its forward end is pivoted to a rocker arm or lever 31 fixed to the shaft 10. It will thus be seen that the shafts 10 and 11 are so connected with each other and with the operating shaft 20 that when the shaft 20 is rotated, the rod or link 23 which connects the levers 22 and 24 will impart rotary motion to the shaft 11 and as this shaft rotates, the link 27 will impart movement to the block 28 and as this block moves, the rod 30 and rocker arm or lever 31 will cause the shaft 10 to rotate with the shaft 11 in the same direction and at the same rate of speed. Therefore, the arms 14 and 15 will both be swung upwardly at the same time and cause front and rear portions of the auxiliary platform to be simultaneously moved to an elevated position at an even rate of speed and when the operating shaft 20 is rotated in a reverse direction, the auxiliary platform will be evenly lowered.

Hydraulic means has been provided for imparting rotary motion to the operating shaft 20 and consists of a cylinder 32 which rises from a base 33 bolted or otherwise firmly secured to a neck or reduced extension 34 which projects forwardly at the front end of the main platform. This base also supports a pump 35 having an operating treadle 36 for its plunger 37. The treadle is pivotally mounted at the upper end of a support or fulcrum 38 and has short ears 39 between which a roller 40 is mounted. The roller bears against the disc or head 41 at the upper end of the plunger 37 and it will be readily seen that when the operator places a foot upon the treadle and forces it downwardly in opposition to action of the spring 42, the plunger 37 will be depressed and oil forced from the pump 35 into the cylinder 32 to raise the piston rod 43. The rod of the piston extends upwardly from the cylinder through a packing gland 44 at the upper end of the cylinder and at its upper end carries a cross head 45 which projects from opposite sides of the piston rod and has its ends loosely engaged through eyes 46 at upper ends of arms or links 47 which extend vertically in depending relation to the cross head. At their lower ends the arms 47 are formed with forks 48 between which rocker arms or levers 49 carried by the operating shaft 20 are pivotally mounted so that when the piston of the cylinder 32 is moved vertically either upwardly or downwardly, rotary motion will be imparted to the operating shaft 20 and the arms 14 and 15 caused to swing vertically and raise or lower the auxiliary platform according to the direction in which the shaft 20 is rotated. It will thus be seen that by sliding the truck under an article of furniture or any other object which it is desired to lift and transport from one place to another, the truck may be disposed in its proper position under the article and the treadle 36 then operated to force oil into the cylinder to raise the piston and cause the auxiliary platform to be shifted upwardly until this auxiliary platform engages the article and moves the article to an elevated position in which its supporting feet or legs will be out of contact with a floor. The handle may then be grasped and the truck either pulled forwardly or pushed rearwardly to move the article to the new location and oil then permitted to flow from the cylinder back into the pump so that the auxiliary platform will move downwardly to its lowered position and allow the article to again rest upon a floor.

The handle, which is indicated in general by the numeral 7, is formed from a single length of strong metal which is bent intermediate its length to form a hand grip 50 having arms 51 converging downwardly therefrom and then bent to provide portions extending in parallel contacting engagement with each other to form a strong shank 52 for the handle. At the lower end of the shank, portions of the bar or rod from which the handle is formed are bent away from the shank, as shown at 53, to form a fork or yoke having depending arms 54 which are spaced from each other a sufficient distance to straddle the hydraulic operating mechanism. At their lower ends the arms 54 are bent outwardly to form pintles 55 which are rotatably received in the bearings 6 and serve to pivotally connect the handle with the main platform of the truck for vertical swinging movement so that it may be disposed in an upright position, as shown in the drawings, where it will be out of the way when the truck is not in use or swung downwardly to an extended position in front of the truck when the truck is in use. The dimensions of the fork of the handle not only permits the handle to be swung upwardly to the upright position shown in Figures 1 and 2, but also causes the handle to be connected with the main platform adjacent opposite sides thereof so that the force exerted when pulling or pushing upon the handle will be well distributed and not only permit the truck to be very easily pulled or pushed but also permit it to be easily guided.

Figure 4:
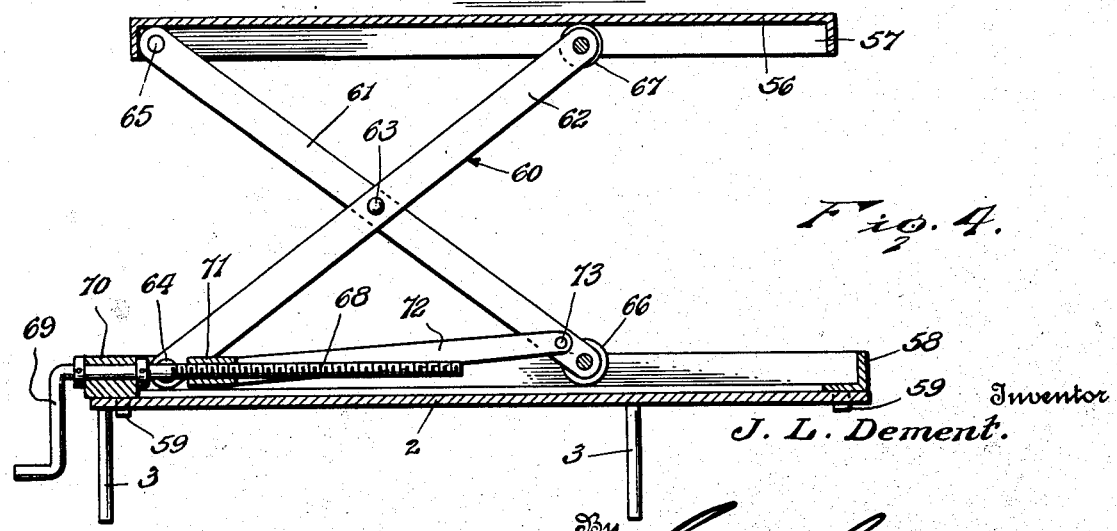
Figure 4 is a sectional view showing a supplemental frame mounted upon the auxiliary platform for use when lifting articles having legs which support them at quite a height above a floor.

If an article having its body supported quite a height above the floor is to be transported, the supplemental frame shown in Figure 4 is employed as the auxiliary platform 2 cannot be elevated a sufficient distance to engage and raise an article having relatively long legs. This supplemental frame or support has a platform 56 formed of strong sheet metal similar to that from which the platforms 1 and 2 are formed and about its margins is formed with depending flanges 57 which reinforce the platform and prevent it from bending easily. A lower frame 58, which is of open rectangular outline, is formed from angle metal and at its corners carries depending lugs 59 which are to engage in the openings or sockets 5 of the auxiliary platform 2 and prevent this frame from sliding longitudinally or transversely out of its proper position upon the truck. At each side of the frame 58 is disposed lazy tongs 60 consisting of strong bars 61 and 62 which are pivotally connected by a pin 63. Lower ends of the bars 62 of the two lazy tongs are pivoted to rear side portions of the frame 58, as shown at 64, and rear or upper ends of the bars 61 of the two lazy tongs are pivotally connected to depending side flanges of the platform 56 near their rear ends, as shown at 65. It will thus be seen that the bars or links 61 and 62 will be pivotally connected with the platform 56 and rear corner portions of the frame 58. At their forward ends, the bars or links 61 and 62 carry rollers 66 and 67 which make contact with side portions of the frame 58 and the under face of the platform 56 so that the links may easily move longitudinally of the frame and platform during a raising or lowering operation. A threaded shaft 68, which has a crank 69 at its outer end, is journaled through the bearing blocks 70 carried by the frame 58 approximately midway the width of the rear bar thereof and this threaded shaft is threaded through a cross head 71 which extends transversely of the frame 58 and at its ends carries arms 72 which extend forwardly of the frame and at their forward ends are pivotally connected to the links or bars 61 adjacent their forward ends, as shown at 73. When this supplemental frame is in use it is set in place upon the auxiliary platform 2 in a collapsed condition with its platform 56 resting upon its frame 58. The truck is then moved under the article to be lifted and the crank handle 69 operated to rotate the shaft 68 and expand the toggle 60 until the platform 56 makes contact with the article. The hydraulic mechanism previously described will then be operated to move the auxiliary platform upwardly and as the supplemental frame will be elevated with the auxiliary platform, the article will be raised out of contact with the floor. The truck will then be moved to the position where it is desired to deposit the article and after the auxiliary platform has been lowered, the truck may be withdrawn with the supplemental frame still in extended condition or the supplemental frame may be collapsed before the truck is withdrawn. I have, therefore, provided a truck by means of which bulky furniture or other heavy articles may be very easily lifted and transported from one place to another.

Having thus described the invention, what is claimed as new is:

1. A device of the character described comprising a truck having a body, an auxiliary platform disposed over the body and shiftable vertically toward and away from the body, rocker shafts mounted under the body, arms carried by said rocker shafts and engaging the auxiliary platform for vertically adjusting the auxiliary platform when the rocker shafts are rotated, a drive shaft rotatably mounted, means for transmitting rotary motion from the drive shaft to the rocker shafts, and means for rotating the drive shaft.

2. A device of the character described comprising a truck having a main platform, an auxiliary platform disposed over the main platform and shiftable vertically, openings being formed in the main platform, rocker shafts extending transversely of the main platform and rotatably mounted in spaced relation to each other longitudinally of the main platform, arms fixed to said rocker shafts and movable through the openings of the main platform to engage the auxiliary platform and vertically adjust the auxiliary platform when the rocker shafts are rotated, a drive shaft rotatably mounted and extending transversely of the main platform adjacent the front end thereof, a bell crank lever carried by the rear shaft, an arm carried by the drive shaft, a link connecting the arm of the drive shaft with the bell crank lever of the rear shaft, a rocker suspended from the main platform for pivotal movement longitudinally thereof, a link connecting the bell crank lever with the rocker, a link extending forwardly from the rocker, an arm carried by the front shaft and engaged by the forward end of the last-mentioned link, and hydraulic means connected with the drive shaft for rotating the same and effecting vertical adjustment of the auxiliary platform.

3. A device of the character described comprising a truck having a body, an auxiliary platform disposed over the body and shiftable vertically, front and rear rocker shafts rotatably mounted transversely of the body, arms carried by said shafts for engaging the auxiliary platform and moving the same upwardly when the shafts are rotated in one direction, means connecting said shafts for effecting simultaneous rotation thereof, a drive shaft rotatably mounted transversely of the body, means connecting the drive shaft with one of the rocker shafts for imparting rotation thereto when the main shaft is rotated, a lever arm carried by the drive shaft, and operating means carried by the body and connected with the lever arm of the drive shaft for controlling rotation of the drive shaft.

4. A device of the character described comprising a truck having a body, an auxiliary platform disposed over the body and shiftable vertically, means carried by the body for shifting the auxiliary platform vertically and supporting it in an adjusted position including an operating shaft rotatably mounted, lever arms extending from said operating shaft, an extension at one end of the body disposed between the lever arms, a hydraulic jack carried by and rising from the extension, a cross head carried by said jack and extending transversely of the extension from opposite sides of the jack, links carried by and extending downwardly from the cross head at opposite sides of the extension with their lower ends pivoted to the lever arms of the operating shaft, and a handle having elongated forks straddling the extension and jack and pivoted to the body at opposite sides of the extension to mount the handle for swinging movement from a raised position to a lowered position.

5. A device of the character described comprising a truck having a main platform, an auxiliary platform disposed over the main platform and shiftable vertically, means carried by the main platform for shifting the auxiliary platform vertically and supporting it in a raised position including an operating element having arms, an extension for the main platform, a hydraulic jack carried by said extension and having a cross head, links depending from the cross head at opposite sides of the extension and connected with said arms, and a handle for the truck having forks straddling the extension and the said jack and connected with the truck to mount the handle for swinging movement from a raised position to a lowered position.

6. In a device of the character described, a truck having a body, an auxiliary platform disposed over the body and shiftable vertically, means for shifting the auxiliary platform vertically and supporting it in an adjusted position, the auxiliary platform being formed with sockets, a removable frame resting upon the auxiliary platform and having anchors engaged in said sockets to prevent shifting of the frame upon the auxiliary platform, a load engaging platform disposed over said frame, and means for shifting the load engaging platform vertically and supporting the same in an adjusted position.

7. An attachment for a moving truck comprising a frame adapted to rest upon a truck and having side bars and an end bar, a load engaging platform disposed over said frame, lazy tongs carried by the frame and platform and disposed between the same for vertical expansion and contraction, a threaded shaft journaled through the end bar of the frame and extending longitudinally thereof, a block threaded upon said shaft and shiftable along the same when the shaft is rotated, and links connected with the block and lazy tongs for expanding and contracting the lazy tongs when the shaft is rotated whereby the load engaging platform may be vertically adjusted and supported in an adjusted position.

JOHN L. DEMENT.